United States Patent [19]

Kuchta

[11] Patent Number: 4,947,758
[45] Date of Patent: Aug. 14, 1990

[54] HIGH PERFORMANCE CHAIN FOR AUTOMATED TRANSPORT SYSTEM

[75] Inventor: Richard Kuchta, Tolland, Conn.

[73] Assignee: Gerber Garment Technology, Inc., Tolland, Conn.

[21] Appl. No.: 362,828

[22] Filed: Jun. 6, 1989

[51] Int. Cl.⁵ .................. B61B 13/02; B61B 10/02
[52] U.S. Cl. ...................... 104/172.5; 104/172.4; 104/111
[58] Field of Search ............ 104/91, 130, 172.1–172.5; 198/687, 730–732; 301/63 PW

[56] References Cited

U.S. PATENT DOCUMENTS

| | | | |
|---|---|---|---|
| 3,006,456 | 10/1961 | Ferris et al. | 104/172.5 X |
| 3,523,504 | 8/1970 | Jones | 104/172.4 |
| 3,598,228 | 8/1971 | Pipes | 198/687 |
| 3,790,220 | 2/1974 | Manss | 301/63 PW X |
| 4,360,222 | 11/1982 | Fisher | 301/1 X |
| 4,483,252 | 11/1984 | Pierson | 104/172.4 X |

Primary Examiner—Andres Kashnikow
Assistant Examiner—A. Muratori
Attorney, Agent, or Firm—McCormick, Paulding & Huber

[57] ABSTRACT

A chain is used in an automated transport system to propel free travelling trolleys riding along a rail toward designated workstations, the chain runs within a U-shaped recess in a track channel on wheels rotatably supported by axles carried by individual links of the chain. The wheels are formed from a self-lubricating material and the axle carried by each of the links of the chain have finished outer surfaces thereby substantially enhancing the pressure-velocity value of the chain so that the chain may be run at velocities greatly in excess of those velocities presently achieved by known chains used in such automated transport systems.

20 Claims, 5 Drawing Sheets

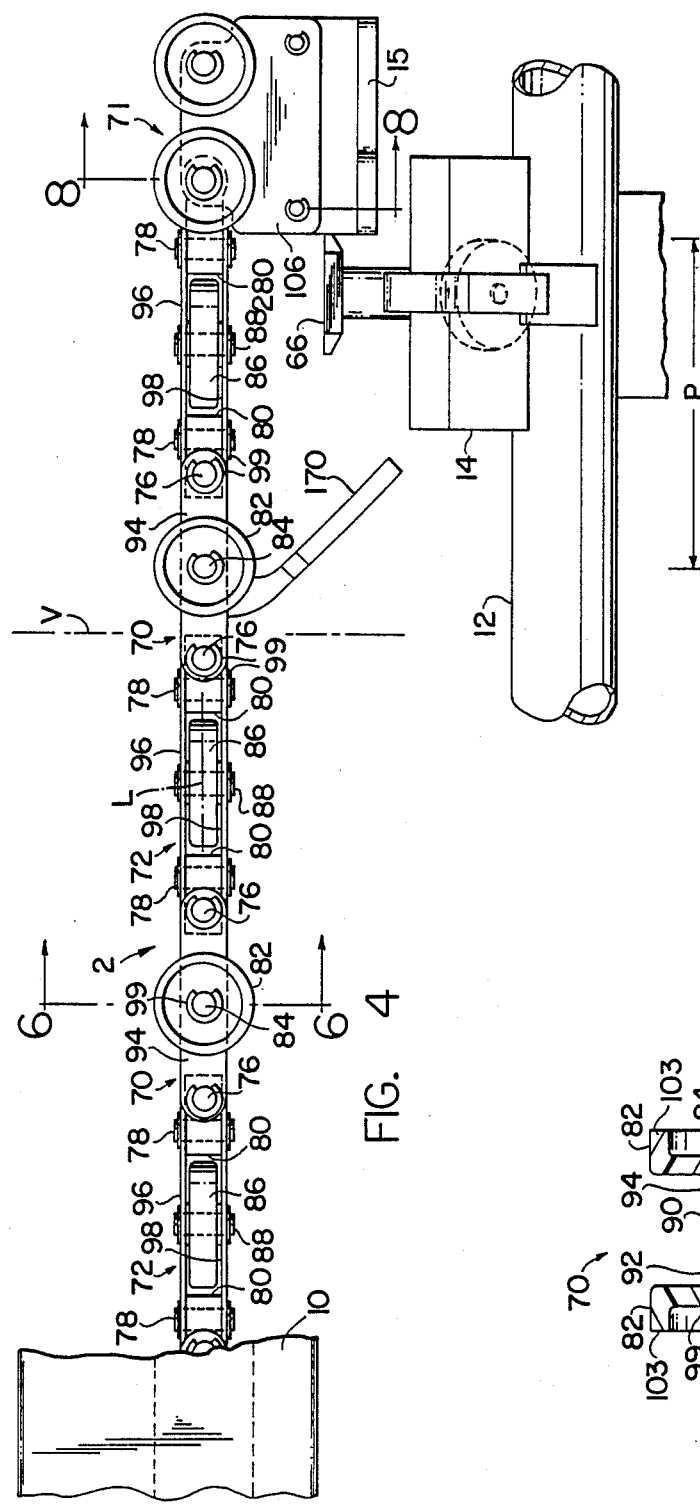
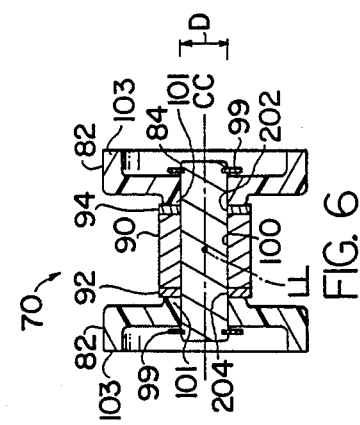
FIG. 4
FIG. 6

HIGH PERFORMANCE CHAIN FOR AUTOMATED TRANSPORT SYSTEM

BACKGROUND OF THE INVENTION

The invention relates generally to an endless chain used in an automated transport system and moved under power through a channel track suspended above a rail to propel free travelling trolleys along the rail, and more particularly relates to an improved endless chain capable of being moved under power through such channel tracks at higher speeds and with less friction than other previously known chains.

In automated transport systems of the type which this invention is concerned, the speed at which trolleys can be moved from one position in the system to another is critical. These systems are typically found in garment making plants where workpieces are carried by trolleys between a series of workstations where various work operations are performed on the workpieces or at which locations the workpieces may be moved for storage for transportation later in time. Such a transport system is disclosed in U.S. Pat. No. 4,712,485 issued to Roland P. Nymark on Dec. 15, 1987 and currently assigned to the assignee of the present invention. The aforesaid reference discloses a chain which includes a restricting bracket and a pusher element separated from the associated bracket and carried by the chain to engage with and move a selected one of a series of free travelling trolleys on a rail. However, the chain disclosed in this reference experiences significant problems when the system attempts to function at peak operating levels. Also, these previously known chains are found to be potentially damaging to the workpieces transported in the system.

One problem associated with the chain disclosed in U.S. Pat. No. 4,615,273 is that the wheel journals and the associated axles about which the wheels of the chain rotate, must be lubricated by bathing these journals with a liquid oil film. The liquid oil used to create the lubricating film is extremely offensive in a system where expensive garment material is being moved beneath a traveling chain. In particular, it has been found that the oil lubricating these journals on the chain often drips downwardly from the suspended track and lands on a carried garment piece thereby soiling and damaging such pieces of material during the transporting process. Notwithstanding this point, the oil film used to lubricate this chain is not without its limits. In these previously known chains, the use of an oil film as a lubricant substantially limits the velocity at which the chain can be run. In particular, it was found that at speeds in excess of 35 feet per minute, the oil film supporting the load within the journal does not dissipate frictional heat as fast as it is generated. As such, running the chain at speeds in excess of 35 feet per minute, for example, usually results in localized melting of the component material forming the wheel members in the area of the rotating journals. Consequently, the chains of previously known design could not be moved at speeds in excess of 35 feet per minute. This inability, in turn results in a substantial limitation on the productive capabilities of the transport system as a whole in that time otherwise spent by a worker producing a garment is undesirably spent in travel between work stations on the main rail. Also, these previously known chains create a disturbing amount of noise generated by the insufficiently lubricated wheels moving along the track at high velocities. This noise makes it uncomfortable for workers to perform their designated tasks at their associated work stations. In addition, increased loads brought to bear upon the chain by horizontal forces acting on the chain as it follows the track around a bend, prohibits these previously known chains from moving along a tight radius at high speeds.

Another problem associated with the chains of previously known design is the excessive weight common to each unit length of chain moved under power in the system. Since each link of the chain must be capable of bearing in tension the entire weight of the remaining length of the chain, as well as being capable of supporting whatever additional loads imposed on it by the trolleys being moved, the links often are thick elements formed from heavy materials. This results in the chain being excessively heavy. The excessive weight factor of these chains requires that a significant amount of horsepower be used to move them through the track and around the system. It has been found that for a 400 foot length of a previously known chain, a force of at least 130 pounds is required to set the chain in motion. This force is substantial and is undesirable since it unduly burdens the component parts of the drive means responsible for moving the chain through the system. In particular, the costs in terms of both time and money involved in replacing clutches in the drive motor unit and that involved in the replacement of the motor element itself make it an extremely desirable goal to preserve the drive unit by reducing the loads imposed upon it by the weight of the chain.

Also, it is desirable to minimize the weight of an endless chain used in an automated conveyor transport system such that loads otherwise attributable to the chain's mass may in turn be applied to increase the maximum velocity of the chain or used to carry greater loads at the same velocity. It is known that for a given material, the quantities of pressure and velocity acting on the rotating journals of the wheels are interrelated and, together effect the maximum achievable velocity and/or the maximum load bearing capacity of a given journal bearing. This relationship has sometimes been referred to as the pressure-velocity value of a given material and has been quantified as:

$$P \times V = C$$

where, P represents the pressure in pounds-per-square inch acting on a cross-sectional area of an axle, V represents the surface velocity in feet-per-minute of a journal about an axle surface, and C represents given pressure-velocity constant or value for a particular material. Thus, for a given pressure velocity constant for a particular material, an increase in the maximum attainable velocity may be achieved by decreasing the amount of pressure bearing on the rotating journals of the chain.

There are other factors beside the problems listed above which may cause problems in an automated transport system which robs it of valuable energy and, therefore of valuable needed chain speed. For example, the axles upon which the wheels in the previously known chains rotate are subject to wear, gauling, fretting and corrosion which eventually leads to the seizing up o: the wheels on individual ones of the axles or leads to an outright seizing of the chain in the track.

Accordingly, it is an object of the present invention to provide an improved endless chain for an automated transport system having wheels formed from a self-lubricating material, which wheels being capable of movement along a track in the transport system at greatly enhanced speeds without employing liquid lubricants supplied to the journals upon which the wheels of the chain rotate.

It is yet a further object of the present invention to form the wheels of an endless chain used in an automated transport system from a material having a high pressure-velocity value such that the chain may be moved along a track at velocities in excess of sixty feet per minute while continuing to maintain the same load bearing capability of other, slower moving chains.

A further object of the present invention is to provide a high performance chain of such a construction as to possess one third of the total weight of the previously known chains while obtaining equal if not an enhanced strength in tension.

Still a further object of the present invention is to form the rotating journals of an endless chain used in an automated transport system so as to reduce the amount of pressure acting on these journals for a given load to be moved by the chain.

SUMMARY OF THE INVENTION

The invention resides in an endless chain for movement in a track channel of an automatic transport system of the type having a plurality of free spinning wheels engageable on correspondingly oriented surfaces of the guide track. The chain of the present invention is comprised of a plurality of links each having a longitudinal axis and having opposite distal ends being arranged end to end with one another to form the chain length. Each of the links are comprised of two thin, spaced apart plates extending generally parallel to each link axis. Linkages or blocks connect the links in the end to end arrangement and are positioned between adjacently opposed distal ends of the links and between the spaced apart plates of each link of the plurality of the links. Individual ones of the plurality of links carry wheel means which include at least one wheel and an axle. The at least one wheel and axle are positioned between the distal ends of the individual ones of the links carrying the wheel means such that the axle extends generally transversely of the longitudinal axis of the associated one of the links carrying the wheel means. The at least one wheel being formed from a self-lubricating material and having a through journal opening rotatably receiving the axle. The outer surface of the axle has a smooth finished bearing surface cooperating with the journal opening formed in the at least one wheel such that the cooperation between the axle finished surface and the self-lubricating material of the at least one wheel acts to substantially reduce the amount of journal friction occurring between the axle and the at least one wheel thereby allowing a greater maximum velocity for a given carried load to be achieved by the chain as it is moved along the track in the system.

The invention also resides in a chain having both vertically and horizontally oriented links with the vertically oriented links carrying two vertically disposed wheels and the horizontally disposed link carrying a single, horizontally disposed wheel. The vertically disposed link carries an intermediate link spacer interposed between two of the plates comprising that link and may also carry a bracket pivotal about the spacer and moveable into abutment with the end face of a linkage positioned adjacent a pivotal bracket. The horizontally disposes wheel carries a spacer part formed integrally with the wheel journal to provide intermediate link support.

According to another feature of the invention, the vertical link may be modified to comprise downwardly extending portions attached to a pusher element, these link portions are spaced apart from one another by a narrowly formed portion of a linkage associated with each end of modified link.

BRIEF DESCRIPTION OF THE DRAWINGS

FIG. 4 is a side fragmentary view of a section of the track through which a chain embodying the present invention is shown travelling in the automated transport system of FIG. 1.

FIG. 6 is a sectional view taken along line 6—6 in FIG. 4 through a vertical link of the chain embodying the present invention.

DETAILED DESCRIPTION OF THE PREFERRED EMBODIMENTS

Figure 1:
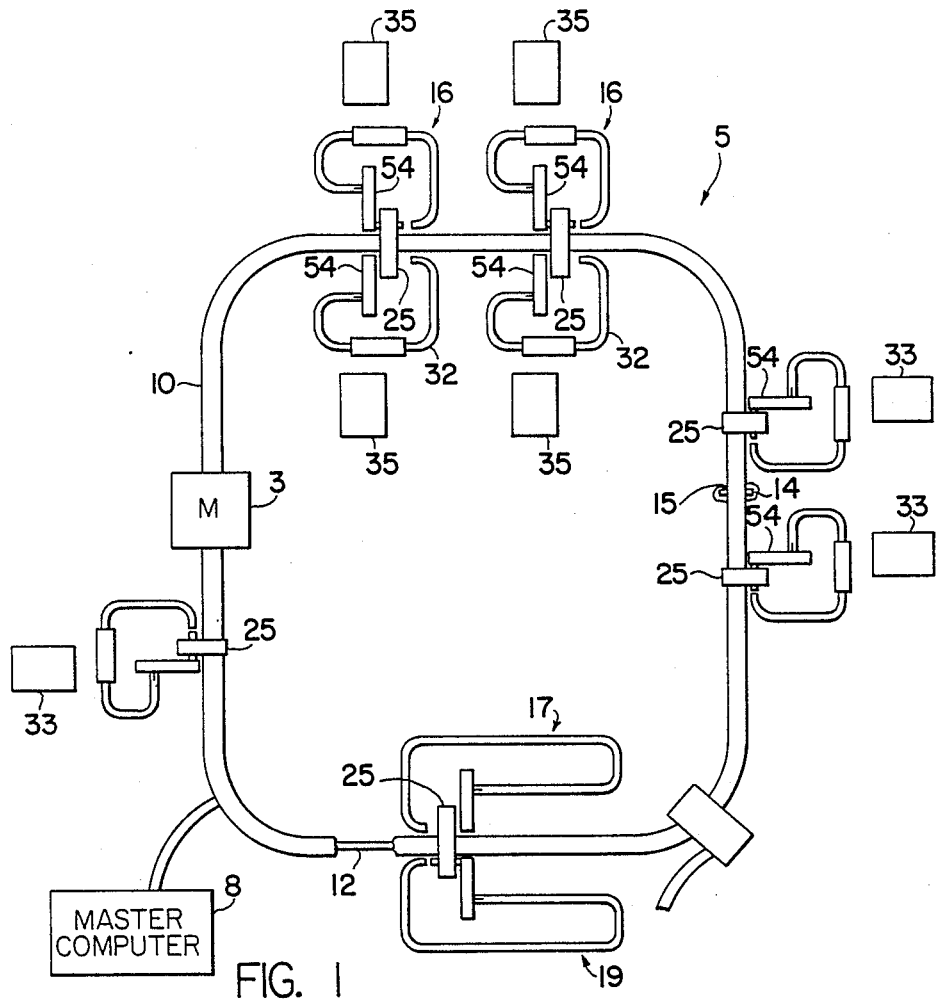
FIG. 1 is a top view of an automated transport system which utilizes the endless chain of the present invention.

Turning first to FIG. 1, an automated transport system shown generally as 5 employs the invention. The system includes a propulsion track 10 in the form of an extruded channel through which an endless chain 2 having pushers 15,15 travels under power from a motorized drive unit 3. Situated beneath the track 10 is a main rail 12 along which freely traveling trolleys 14,14 ride while being propelled by the pushers 15,15. Positioned along the track 10 along either or along both sides, such as in pairs, are subsidiary loops 16,16 and 32,32 leading to and from a work station 33 or 35, and are subsidiary loop 17 and 19 leading to storage facilities from the track 10. The automated transport system 5 further includes a master computer 8 for controlling the movements of three position switches 25,25 which route the trolleys between the main rail 12 and each pair of subsidiary loops 32,32 and 16,16 or directly between adjacently disposed subsidiary loop pairs 32,16 and 32,16.

Figure 2:
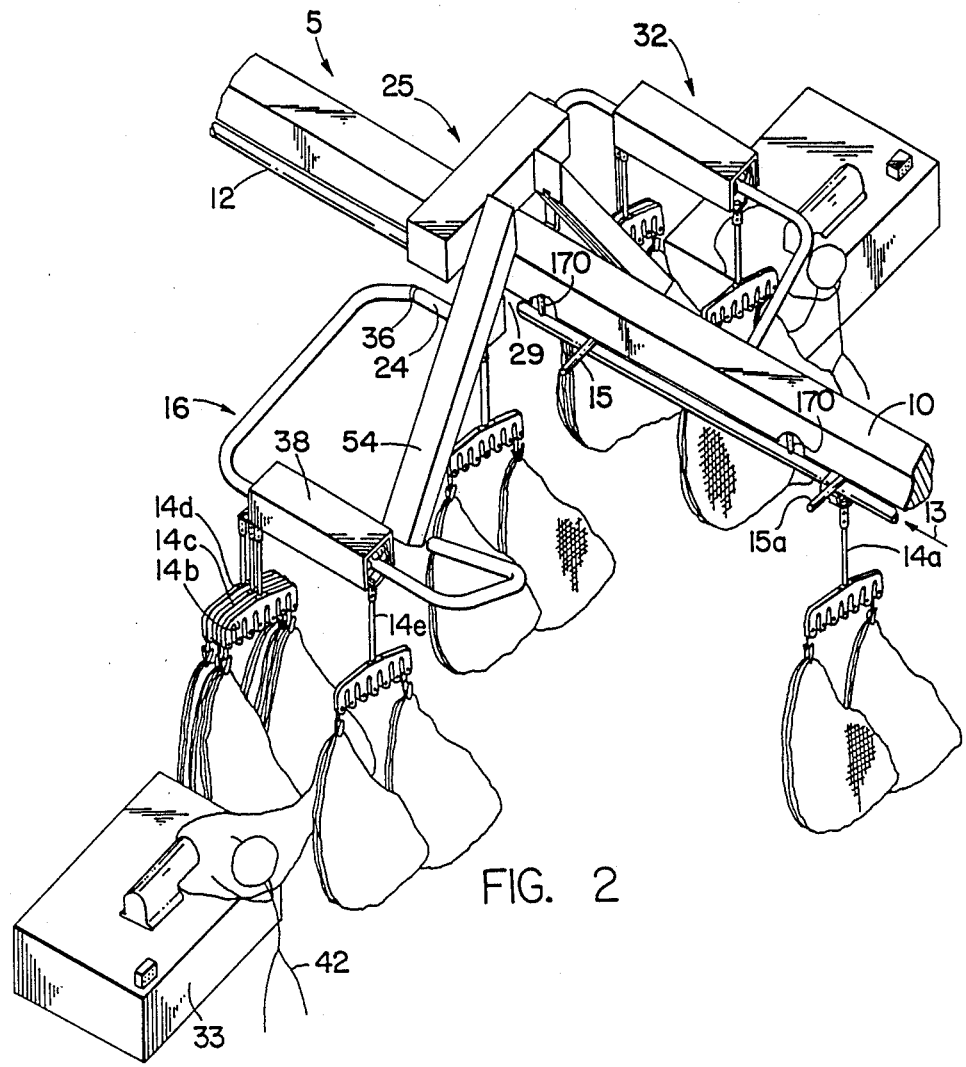
FIG. 2 is a perspective view of a portion of the automated transport system of FIG. 1.

Referring now to FIG. 2 a section of the automated transport system 5 of FIG. 1 is shown and illustrates the propulsion track channel 10 situated above the main rail 12 and a pair of subsidiary loops 16 and 32 positioned adjacent one another and the track channel 10. As shown, a trolley 14a rides on the main rail 12 and is propelled in the illustrated direction shown as 13 by one of the pushers 15 specifically identified as 15a carried in turn by the chain 2 (not shown). The pushers 15 extend downwardly from and are driven by the endless chain 2 located within a generally U-shaped recess form in the track channel 10. A series of restricting brackets 170 also extend downwardly from and are driven by the endless chain 2 and are positioned in front of each of the pushers 15,15 such that the trolley 14a, as shown in FIG. 2, is moved toward the subsidiary loop 16 under the positive force of the pusher 15a.

A leading end 36 of each of the subsidiary loops 16 and 32 are laterally aligned with one another and with a gap 29 formed in the rail 12 such that a rail section 24 carried by the switch 25 is moved by the switch 25 between positions aligned with each of the ends 36 of the subsidiary loops 16,32 and with the gap 29 formed in the main rail 12. When desired, a selected one of the trolleys 14 being moved along the main rail 12 may be diverted into one of the subsidiary loops 16 or 32 by transferring the position of the rail segment 24 to a position in line with one of the subsidiary loop ends 36 as the pusher 15 is moved downstream in the indicated direction 13 along the track 10. For a more complete description of the transferring operation reference may be had to U.S. Pat. No. 4,615,273 entitled CONVEYORIZED TRANSPORT SYSTEM issued to Osthus et al. on Oct. 7, 1986.

The looping pipe of each of the loops 16 and 32 slopes downwardly from the entrance end 36 so that a trolley rolls along it toward the work station 33 under gravity. A stop 38 having a gate is positioned along the subsidiary loop such that trolleys, shown for example as 14b through 14d, may collect at the upper end of the gate 38 and may be separately released by the stop 38 toward a position adjacent a worker 42 at the workstation 33. Once the work on the workpiece carried by the trolley 14e shown in FIG. 2 is completed, the worker 42 subsequently releases the trolley 14e from the gate in the stop 38 and the trolley proceeds downwardly again toward an elevator 54 which in turn carries the trolley upwardly and onto the rail segment 24. Once the trolley is positioned on the rail segment 24, a pusher 15 again contacts with the trolley and moves the trolley in the indicated direction 13 while, simultaneously the switch 25 moves the rail section 24 into position bridging the gap 29 in the rail 12 so that the trolley may continue along the rail 12 toward a next workstation.

Figure 3:
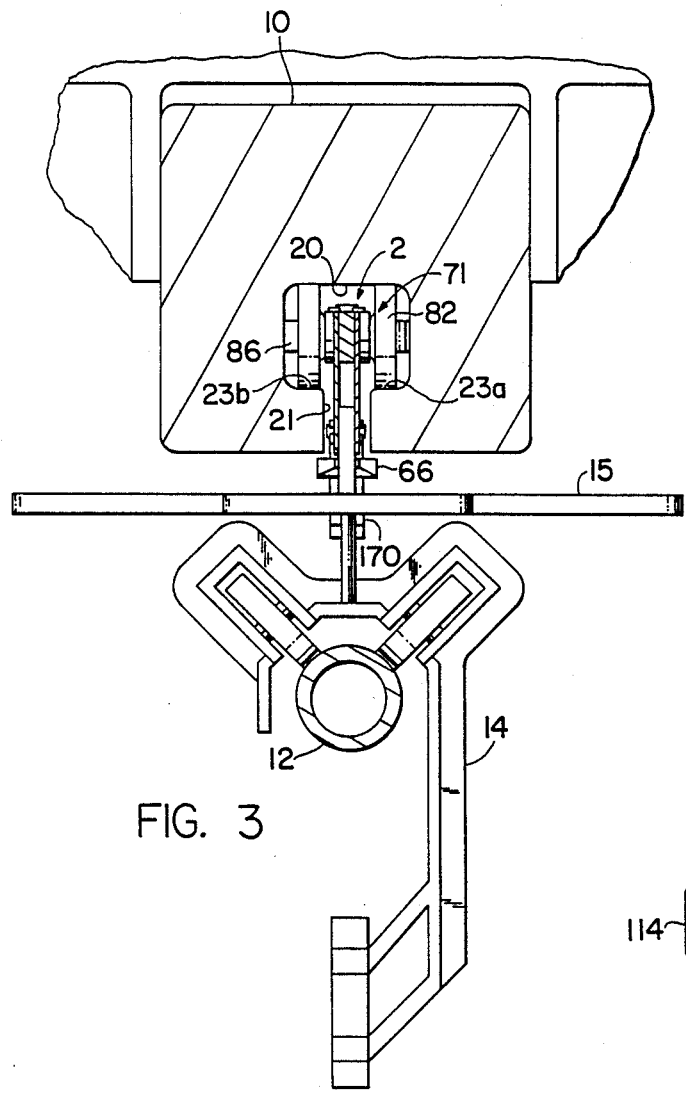
FIG. 3 is a rear sectional view of the endless chain housed within a track showing a trolley, a restricting bracket and a pusher of the automated transport system of FIG. 1.

As is shown in FIG. 3, the chain 2 travels along the track 10 within a substantially U-shaped, longitudinally extending recess 20 having a slot 21 defined by two laterally disposed portions 23a, 23b of the recess 20 such that the slot 21 extends longitudinally of the channel length and communicates between the interior recess 20 and the external surface of the channel 10. The brackets 170, as will be described in greater detail later, are pivotally mounted to the chain 2 and are correspondingly sized relative to the width of the slot 21 to extend downwardly from the chain 2 through the slot 21 selectively engaging with a designated one of the trolleys 14. Also, the pusher 15 is positioned below the track channel 10 by downward portions of modified links 71 extending through the slot 21 from the chain 2 for the purpose of carrying the pushers 15. The connection between the pusher 15 and the chain 2 will be discussed in greater detail with reference to FIG. 8. but, for the moment it should be appreciated that a selected one of the trolleys 14 may firstly be contacted by the pivoting bracket 170 passing over a crown portion 66 of the trolley 14 and subsequently positively engaged by pusher 15 to move it along the rail 12 to another position downstream of this point of engagement.

Figure 5:
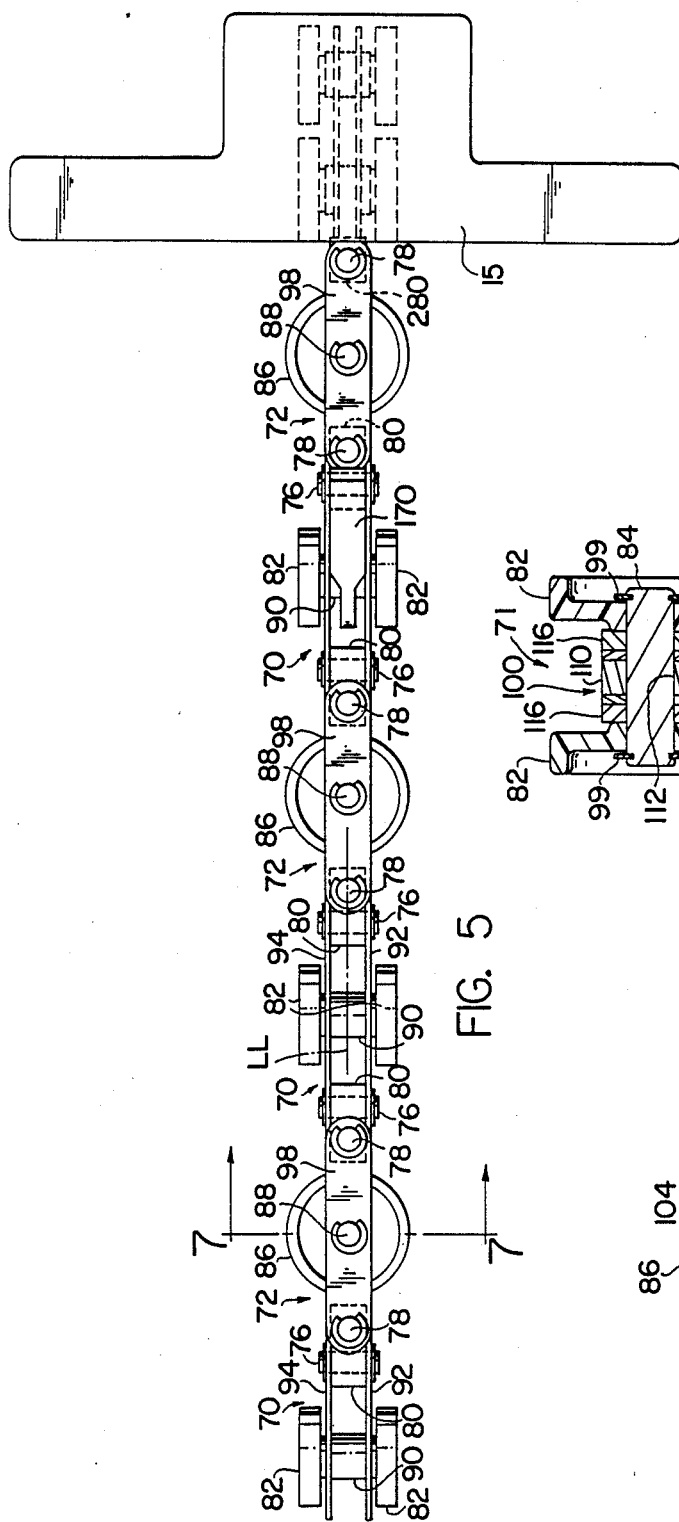
FIG. 5 is a bottom view of the chain embodying the invention shown in FIG. 4 absent the track and the rail.

In accordance with the invention, an improved endless chain is illustrated in FIGS. 4 and 5 having means allowing the chain to be moved by the drive unit 3 at velocities substantially greater than those maximum velocities previously achieved by other known chains. To this end, the improved chain 2 comprises vertical links 70,70 and horizontal links 72,72, with each of the vertical links 70,70 being connected in an end to end manner to an adjacently disposed one of the horizontal links 72,72 via a horizontal pin 76 and a vertical pin 78 passing through correspondingly sized vertical and horizontal openings formed in connecting blocks or linkages 80 to allow relative vertical and horizontal pivoting between links 70 and 72 as required for the chain 2 to follow the course of the main track 10. It should be appreciated that the dual axis pivoting capability of the chain 2 is needed to accommodate the normal course of the track 10 which bends laterally out of a common vertical plane in order to achieve the loop configuration shown in FIG. 2 as well as permitting the chain 2 to turn upwardly or downwardly out of a common horizontal plane where the track 10 may bend vertically in order to reach elevated or depressed regions within a manufacturing facility. Also, each vertical link 70 includes a pair of vertical wheels 82 for rotation about a common horizontally disposed axle 84 and each of the links 72 includes a horizontal wheel 86 mounted for rotation on a vertically disposed axle 88. As can be appreciated from FIG. 3, each of the horizontal wheels 86 accordingly cooperates with a juxtaposed sidewall of the recess 20 and rotationally bears horizontal loads imposed on the chain 2 as the wheels 86 laterally center the chain 2 within the track 10. Similarly, each pair of the vertical wheels 82 co-acts with the upper surfaces of the laterally disposed portions 23a and 23b of the track 10 to rotationally bear the vertical loads imposed upon the chain 2.

Figure 7:
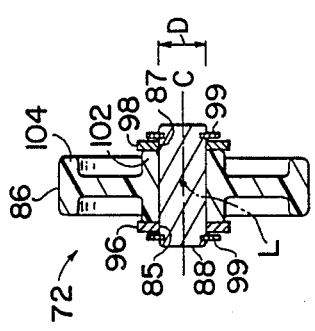
FIG. 7 is a horizontal view taken along line 7—7 of FIG. 5 through a horizontal link of the chain embodying the present invention.

As is illustrated in FIGS. 4 and 7, the horizontal links 72 are each comprised of plates 96 and 98 extending generally parallel with the horizontal link longitudinal axis L and having through openings 85 and 87, respectively supportingly receiving an associated one of the axles 88. The axles 88 are held against lateral displacement relative the plates 96 and 98 by C-shaped, snap-in place retaining rings cooperating with circumferentially extending grooves formed in the axles 88. The horizontal wheel 86 carried by the link 72, has an annular flange 102 disposed about its center C defining a journal opening rotatably receiving the axle 88. When assembled, the lateral side surfaces of the annular flange 102 cooperate with the associated juxtaposed surfaces of the plates 96 and 98 to orient these plates in a spatial, lateral relationship with one another. Also, the flange 102 creates addition bearing length and thus provides an increased bearing surface area effectively decreasing the amount of pressure experienced by the axle 88 when it is loaded. In addition, the outer circumference of the horizontal wheel 86 is likewise annularly flanged at 104 to more evenly distribute the loads along the surface of the wheel 86 and thereby reduce the amount of rolling friction for a given wheel.

As is shown in FIGS. 5 and 6, the vertical links 70 are each comprised of plates 92 and 94 extending generally parallel to the vertical link longitudinal axis LL and having through openings 202 and 204, respectively supportingly receiving the axle 84. The plates 92 and 94 are positioned laterally of one another by a spacer 90 preferably formed from a lightweight, polymeric material, such as Delrin or the like, and having a through opening 100 corresponding in size and in shape to the openings 202 and 204 for rotatably and supportingly receiving the associated axle 84. The C-shaped, snap-in place type retaining rings 99 cooperate within circumferential grooves formed on the axle 84 to maintain the spacer 90, the wheels 82 and the adjacently disposed ones of the plates 92 and 94 in a spatial relationship with one another. Also, each of the wheels 82 has an annular flange 101 disposed about its center CC defining a journal opening through which the axle 84 is rotatably received. As discussed previously with respect to the horizontal wheels 86, each of the wheels 82 has an outermost annular circumferential flange 103 for reducing the rolling friction of the wheels 82 along the associated surface of the track 10.

In order that the chain 2 possess sufficient strength when tensioned by the moving force of the drive unit 3, the plates 92,94 and 96,98 respectively comprising the links 70 and 72 are each formed from a high strength and lightweight material, such as 1070 hardened steel. As such, these linking plates may have thicknesses of as little as 0.062 inches, which reduced plate thickness enables the chain 2 to be substantially lighter while simultaneously maintaining the needed tensile strength capacity of previously known chains. The thin plates 92,94 and 96,98 achieve resistance to lateral bending by interconnection with on another through the linkages or blocks 80 interposed between and positioned adjacent the distal ends of each of the plates 92,94 and 96,98. These plates are held against an associated one of the linkages 80 by the retaining rings 99 received within annular grooves formed in the pins 76 and 78. It has been found that by forming the linkages 80 from a lightweight, high strength metal, such as No. 2 Beric, the requisite capacity of the blocks 80 to bear both tensile and bending stresses is obtained while simultaneously effecting a substantial reduction in the overall weight of the chain 2. It should therefore be appreciated that the linkages 80, in cooperation with either the spacer 90 used in the vertical links 70 or the annular flange 102 carried by the wheel 86 in the horizontal links 72 combine with these intermediate spacing elements to support the plates 92,94 and 96,98 against lateral bending at three points along each link length such that the plate pairs 92,94 and 96,98 are rigidly maintained in two, spaced apart, parallel planes.

In accordance with a further aspect of the invention, the wheels 82 and 86 of the chain 2 are formed from a self-lubricating material requiring no liquid lubricant for rotation about axles 84 and 88, respectively, as the chain is moved along the track 10. To this end, it has been found that a mixture of tetrafluoroethylene and a silicone filled acetal creates a compound capable of providing the rotating journals of the wheels 82 and 86 with an infinite source of lubrication when journal friction is created. Moreover, this compound has been found to possess a PV value equal to approximately 9000, which value being an approximate threefold increase over that found in the materials previously employed for the wheels 82 and 96.

In order to enhance the self-lubricating properties of this material, the outer surfaces of each of the axles 84 and 88 are highly smooth and finished. These highly smooth, finished surfaces are created by a centerless grinding operation which forms each of the axles 84 and 88 with a number 16 surface finish. Thereafter, the axle surfaces are plated with an approximately 0.0003 inch thickness of electroless nickel. The axle finished surfaces consequently prevent fretting and gauling while also substantially reducing wear in the localized journal region of the wheels 82 and 86. In addition, the dimension D shown in FIGS. 6 and 7 represents an enlarged outer diameter of the axles 84 and 88, equal to approximately 0.312Δ. This increased axle diameter contributes to the ability of the chain 2 to move at enhanced velocities, such as in excess of sixty feet per minute.

The following expressions illustrate the effectiveness of the aforesaid improvements in the chain 2 which embody the present invention. Generally, it is understood that:

$$P = L / A$$

where;
P equals the pressure exerted on an axle by a wheel journal, and
A is the affected load bearing area equal to
D×1, D being the axle diameter and 1 being the journal length.

Thus, for a given constant load value of L, the pressure P acting on the wheel journals is reduced substantially and proportionally in each of the wheels 82 and 86 by the increase in the axle diameters D and/or any increase in the journal bearing lengths as provided by the annular journal flanges 101 and 102 formed on the wheels 82 and 86. This effected reduction in the pressure value P, in turn allows the wheels 82 and 86 to achieve higher rotational velocities on the axles 84 and 88 since for a given pressure-velocity value C;

$$P \times v = C, \text{ or } V = C / P.$$

In addition, the pressure-velocity value of 9000 for the self-lubricating compound material employed in the present invention for forming the wheels 82 and 86, provides an approximately three-fold increase over other pressure-velocity values inherent in previously known materials used in chains in automated transport systems thereby further contributing to the chain's ability to be moved at enhanced velocities.

Figure 9:
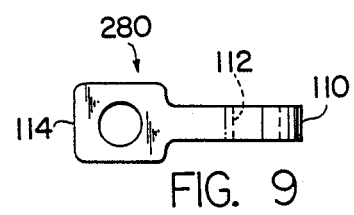
FIG. 9 is a top view of a linkage used to connect the pusher link of FIG. 8 with the chain embodying the present invention.
Figure 8:
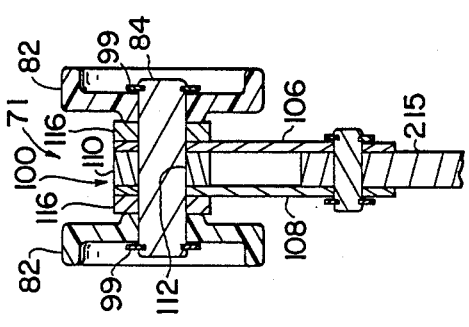
FIG. 8 is a fragmentary vertical sectional view taken along line 8—8 in FIG. 4 through a pusher link of the chain embodying the present invention.

Referring now to FIGS. 4 and 8, it is a feature of the invention to utilize a modified vertical link, illustrated as element 71, for connecting the pusher 15 with the chain 2 for movement along the track 10. Each of the links 71 is comprised of two, spaced apart plates 106 and 108 each extending downwardly from the remaining length of the chain 2 and capturing a vertical flange portion 215 of the pusher 15 therebetween. The link 71 is interconnected with an adjacently disposed one of the horizontal links 72 by a modified linkage or block 200 as shown in FIG. 9. The linkage 280, as shown in FIG. 9, has a first width portion 110, being smaller in dimension than that of the remaining portion of the linkage and has a horizontally disposed through opening 112 for receiving the axle 84 therethrough. The width portion 110 is approximately equal to the width of the flange 215 such that the flange 215 and the portion 110 of the linkage 100 space each of the plates 106 and 108 relative to one another. The remaining, larger portion 114 of block 280 has a width dimension equal to that of the previously discussed links 80 and is capable of being introduced between the normal spacing of plates 96 and 98 of the adjacently disposed ones of the links 72. The plates 106 and 108 of the link 71 are positioned laterally of the portion 110 of the linkage 100 by axle spacers 116 interposed between each of the wheels 82 and the corresponding ones of the plates 106 and 108.

Figure 10:
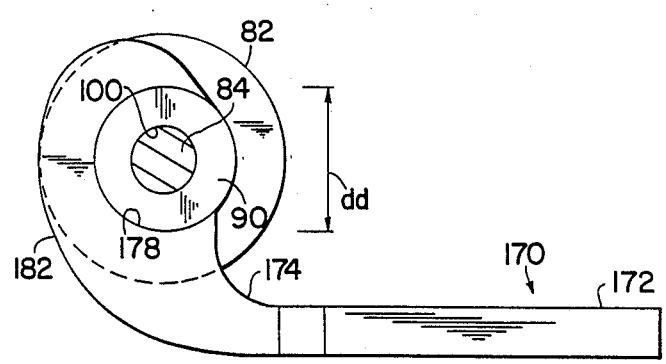
FIG. 10 is a side view of the bracket in FIG. 4 shown separately of its associated link.

In keeping with the invention, FIGS. 4 and 10 illustrate a restricting bracket 170 pivotally carried by one of vertical links 70 at selected distances along the chain 2. The restricting bracket 170 shown in these figures may be formed of metal or plastic and comprises a stem portion 172, a neck portion 174 and a pivot recess 178 formed in the neck portion 174 and a back portion 182 for limiting the pivoting movement of the bracket 170. The illustrated diameter dd of the recess 178 is slightly larger in dimension than that of the outer diameter of the spacer 90 such that the spacer 90 is rotatably received within the recess 178 and a portion of the surface defining the recess 178 bears upon the outer surface of the spacer 90 to pivot the bracket 170 about both the spacer 90 and the shaft 84 upon which a spacer 90 is rotatably mounted.

When assembled to the chain 2, the bracket 170, as shown in FIG. 4, is balanced at an orientation angled approximately 45 degrees relative to a horizontal plane. In this balanced positioned, the bracket 170 is free to pivot toward its associated pusher 15 allowing the illustrated trolley 14 to pass below it and engage with and be subsequently moved along the rail 12 by the pusher 15 as the chain 2 is moved along the track 10. By way of illustration, each of the brackets may be installed in front of an associated pusher 15 at separation distance of approximately 8 inches. This separation distance creates a space defining a trolley pocket P and allows plenty of room to house one trolley yet is short enough to allow the computer 8 to keep reasonably apprised of the trolleys whereabouts. While the trolley 14 is admitted to pass rearwardly of the bracket 170, the bracket 170 cannot pivot forwardly beyond a vertical plane V coincident with the end face of the linkage 80 located adjacent the bracket 170. This is because the back portion 182 of the bracket 170 will abut the end face of the linkage 80 when force is applied in the direction away from the pusher 15. For a more complete description of a similar bracket structure used in a transport system and its related behavior, reference may be had to the above mentioned U.S. Pat. No. 4,712,485 issued to Roland P. Nymark on Dec. 15, 1987.

By the foregoing an improved chain usable in a automated transport system has been described. However, numerous modifications and substitutions may be made without deviating from the scope of the invention. For example while the links 70 and 72 respectively carrying the vertical and horizontal wheels have been disclosed as successively alternatively arranged along the length of the chain 2, it is possible that two consecutive vertical or horizontal links may be used or that one link in an alternating successive arrangement of vertical and horizontal links may not carry a wheel or wheels at all. Therefore, the invention has been described by way of illustration and not by limitation

I claim:

1. A chain having a length movable along a track in an automated transport system, said chain comprising;
    a plurality of links each of having a longitudinal axis and opposite distal ends, said links being arranged end to end with one another to form a chain length; each of said links being comprised of two thin spaced apart plates extending generally parallel with one another and with the link longitudinal axis;
    linkages connected to and positioned between the adjacently opposed distal ends of adjacent ones of said links between said spaced apart plates of each of said links to connect said adjacent ones of said links to one another;
    wheel means carried by at least some of said links and being interposed between said distal ends of the involved ones of said links for guiding said chain along a track by rolling engagement of said wheel means with the track;
    said wheel means for each involved one of said links including at least one wheel and an axle, said at least one wheel being rotatably supported on said axle with said axle extending generally transversely of the longitudinal axis of the link carrying the associated at least one wheel;
    said at least one wheel being formed from a self-lubricating material and having a through opening defining a journal through which said axle is rotatably received; and
    wherein said axle has an outer smooth finished bearing surface cooperating with said journal formed in said at least one wheel such that the cooperation between said axle finished bearing surface and the self-lubricating material of said at least one wheel acts to substantially reduce the amount of journal friction occurring along said at least one wheel journal thereby allowing said chain to achieve a greater maximum velocity for a given load as it is moved along a track in the system.

2. A chain as defined in claim 1 wherein said plurality of links comprises alternating vertical wheel links and horizontal wheel links;
    each of said horizontal wheel links and said vertical wheel links being pivotally connected with one another by said linkages about two orthogonally oriented axes along said chain length.

3. A chain as defined in claim 1 wherein said at least one wheel is a horizontally disposed wheel laterally interposed between said spaced apart plates of the involved ones o; said links; and
    wherein said self-lubricating material forming said horizontally disposed wheel being a compound of tetrafluoroethylene and a silicone filled acetal.

4. A chain as defined in claim 3 wherein said horizontally disposed wheel has an annular flange defining a through opening disposed about the wheel center for rotatably receiving and journally said axle.

5. A chain as defined in claim 4 wherein said smooth finished surface on said axle supporting said horizontally disposed wheel is a plated surface formed from electroless nickel applied to said axle formed by centerless grinding.

6. A chain as defined in claim 5 wherein said axle upon which said horizontally disposed wheel rotatably bears has an outer shaft diameter of approximately 0.312 inches, said plating forming said finished surface on said axle has a thickness of approximately 0.0003 inches, and the thickness of each of said two spaced apart plates is approximately 0.062 inches; and
    wherein said axle has formed at opposite ends thereof, circumferential grooves and said wheel means further including C-shaped retaining rings being received within respective ones of said grooves oriented on said axle for retaining said horizontally disposed wheel on said axle.

7. A chain as defined in claim 1 wherein said wheel means further includes two vertically disposed wheels supported for rotation on said axle; and said self-lubricating material forming each of said vertically disposed wheels being formed from a compound of tetrafluoroethylene and a silicone filled acetal.

8. A chain as defined in claim 7 wherein each of said two vertical wheels is associated with and positioned outwardly of said two spaced apart plates;

each of said vertically disposed wheels having an annularly disposed flange defining a through opening about each vertical wheel center for rotatably journalling said axle in a bearing relationship therewith; and wherein each of said vertically disposed wheels has an outermost annularly extending flange.

9. A chain as defined in claim 7 wherein said smooth finished surface of said axle upon which said two vertically disposed wheels rotate is formed from plated electroless nickel being applied to said axle after it is formed by centerless grinding.

10. A chain as defined in claim 9 wherein said axle upon which said two vertically disposed wheels rotates has an outer diameter equal to approximately 0.312 inches and said plated electroless nickel has a thickness equal to approximately 0.0003 inches.

11. A chain as defined in claim 7 wherein said two spaced apart plates each has a thickness of approximately 0.062 inches and said wheel means further includes a spacer having an opening formed therethrough for receiving said axle;

said spacer being interposed between said two spaced apart plates in said link to provide resistance to bending at three points along said involved one of said links carrying said two vertically disposed wheels.

12. A chain as defined in claim 11 further including a pivotal bracket having a pivot recess with a diameter slightly greater than the outer diameter of said spacer for receiving said spacer therein;

said bracket also having a back portion positioned oppositely of said pivot recess and being cooperable with an adjacently disposed end of an associated linkage to thereby limit the pivotal motion of said bracket away from the involved link carrying it.

13. A chain as defined in claim 12 wherein the bracket includes a stem portion extending from said bracket back portion;

said bracket being balanced on said spacer to position said stem portion of said bracket at approximately 45 degrees relative to a horizontal plane.

14. A chain as defined in claim 7 wherein said spaced apart plates comprising said involved one of said links carrying said two vertically disposed wheels are downwardly extending elements receiving a flange portion of a pusher therebetween;

said linkages connecting said downwardly extending elements to the remaining length of said chain being modified such that each of said linkages have a widened portion and a juxtaposed narrowed portion with said narrowed portion being interposed between and spacing each of said downwardly extending elements; and wherein said wheel means further includes two axle spacers interposed between each of said downwardly extending elements and each of said adjacently disposed wheels thereby preventing lateral displacement of said wheels relative to said chain.

15. A chain as defined in claim 1 wherein said linkages are linkage blocks each having through openings disposed orthogonally to one another, said blocks being formed from number 2 Beric metal; and wherein said two, spaced apart plates are fixed in a parallel relationship with one another by each of said linkages, and each of said plates being formed from 1070 hardened steel having a thickness of approximately 0.062 inches.

16. A chain as defined in claim 1 wherein said two spaced apart plates each have a thickness of approximately 0.062 inches and wherein said wheel means carried by said involved ones of said links provides support against bending for said two spaced apart plates at a point intermediate said involved link distal ends.

17. A chain having a length for use in an automated transport system for moving free traveling trolleys running along a rail, said chain comprising;

a plurality of vertically disposed links and horizontally disposed links arranged end to end with one another to form a chain length;

each of said vertically disposed links and said horizontally disposed links having a longitudinal axis and having opposite distal ends and each being comprised of two thin spaced apart plates extending generally parallel to the link longitudinal axis;

linkages connected to and positioned between the adjacently opposed distal ends of adjacent ones of said vertically and horizontally disposed links between said two plates of each of said plurality of links to connect said adjacent ones of said links to one another and to fix said two spaced apart plates of each of said vertically and horizontally disposed links in spatial relationship with one another;

said vertically disposed links each including an axle extending generally transversely of each said vertical link longitudinal axis, which said axle having a finished outer bearing surface;

said vertically disposed links each carrying two vertically disposed wheels each having through openings arranged about each wheel center forming journals through which said axle carried by each of said vertically disposed links is rotatably received;

said vertically disposed wheels o: each of said vertically disposed links being positioned laterally of and on opposite sides of said two spaced apart plates comprising of each of said vertically disposed links;

said vertically disposed wheels further being formed from a self-lubricating material thereby substantially decreasing journal friction between said axle carried by each of said vertically disposed links and each journal of said vertically disposed wheels; and said of horizontally disposed links each comprising an axle extending transversely of each horizontal link longitudinal axis, which said axle having a finished external bearing surface;

said horizontal link including a horizontally disposed wheel having a through opening arranged about the horizontally disposed wheel center forming a journal for rotatably receiving said axle carried by each of said horizontally disposed links;

said horizontally disposed wheel being formed from a self-lubricating material thereby substantially reducing the amount of journal friction occurring between the horizontally disposed wheel journal and said axle carried by each of said horizontally disposed links.

18. A chain as defined in claim 17 wherein said horizontally and vertically disposed wheels are formed from a compound of tetrafluoroethylene and a silicone filled acetal.

19. A chain as defined in claim 18 wherein said axles carried by each of said vertically and horizontally disposed links are plated with electroless nickel having a thickness of approximately 0.0003 inches and each have an outer diameter of approximately 0.312 inches.

20. A chain as defined in claim 19 wherein said axles carried by each of said vertical and horizontal links is formed by centerless grinding; and wherein said plates forming each of said vertical and horizontal links are formed from 1070 hardened steel and said linkages are formed from number 2 Beric metal.

* * * * *